United States Patent [19]

Atkinson et al.

[11] Patent Number: 4,602,134
[45] Date of Patent: Jul. 22, 1986

[54] TELEPHONE TESTER

[75] Inventors: Roger F. Atkinson; Steven C. Dennison; William D. Welch, Jr.; Ronald L. Jolly, all of Huntsville, Ala.

[73] Assignee: Sace, Incorporated, San Angelo, Tex.

[21] Appl. No.: 479,874

[22] Filed: Mar. 29, 1983

[51] Int. Cl.[4] .............................................. H04M 1/24
[52] U.S. Cl. ..................... 179/175.1 R; 179/175.1 A; 179/175.5 B; 340/815.02; 364/189; 179/175.2 R
[58] Field of Search ............ 179/175.2, 175, 175.1 R, 179/175.1 A, 175.11, 175.2 A, 175.2 B, 81 C, 84 L, 99 LS; 340/815.02; 365 VL; 364/188, 189

[56] References Cited

FOREIGN PATENT DOCUMENTS 2356324 2/1978 France ......................... 179/175.2 A

OTHER PUBLICATIONS

A Computer-based System for the Design, Measurement and Assessment of Telephone Sets, P. K. Webb and J. G. Ellis, Conference on Communication Equipment, Apr. 16-18, 1980, pp. 112-116.

Primary Examiner—Stafford D. Schreyer
Attorney, Agent, or Firm—Epstein & Edell

[57] ABSTRACT

A software-controlled telephone tester permits untrained consumers to test telephone sets by connecting the line cord to the tester and following simple instructions which are sequentially displayed on a panel. Tests are automatically performed after each instruction to provide objective determinations of the operability of the telephone under test. Tested parameters which fall outside specification result in a failure indication. If the user fails to effect certain instructions properly, a "try again" instruction is generated. Transmission tests are effected automatically by placing the telephone earpiece and/or mouthpiece adjacent a transducer and transmitting at least one tone from the tester through the telephone and back to the tester. Preferably a two-tone test is employed using a pair of the standard DTMF signalling tones so that transmission testing is effected using the same circuitry employed for DTMF dial testing. The tester transducer is recessed behind the tester panel to reduce the effect of amplitude variations caused by small positional differences in the placing of the mouthpiece/earpiece adjacent the transducer.

28 Claims, 9 Drawing Figures

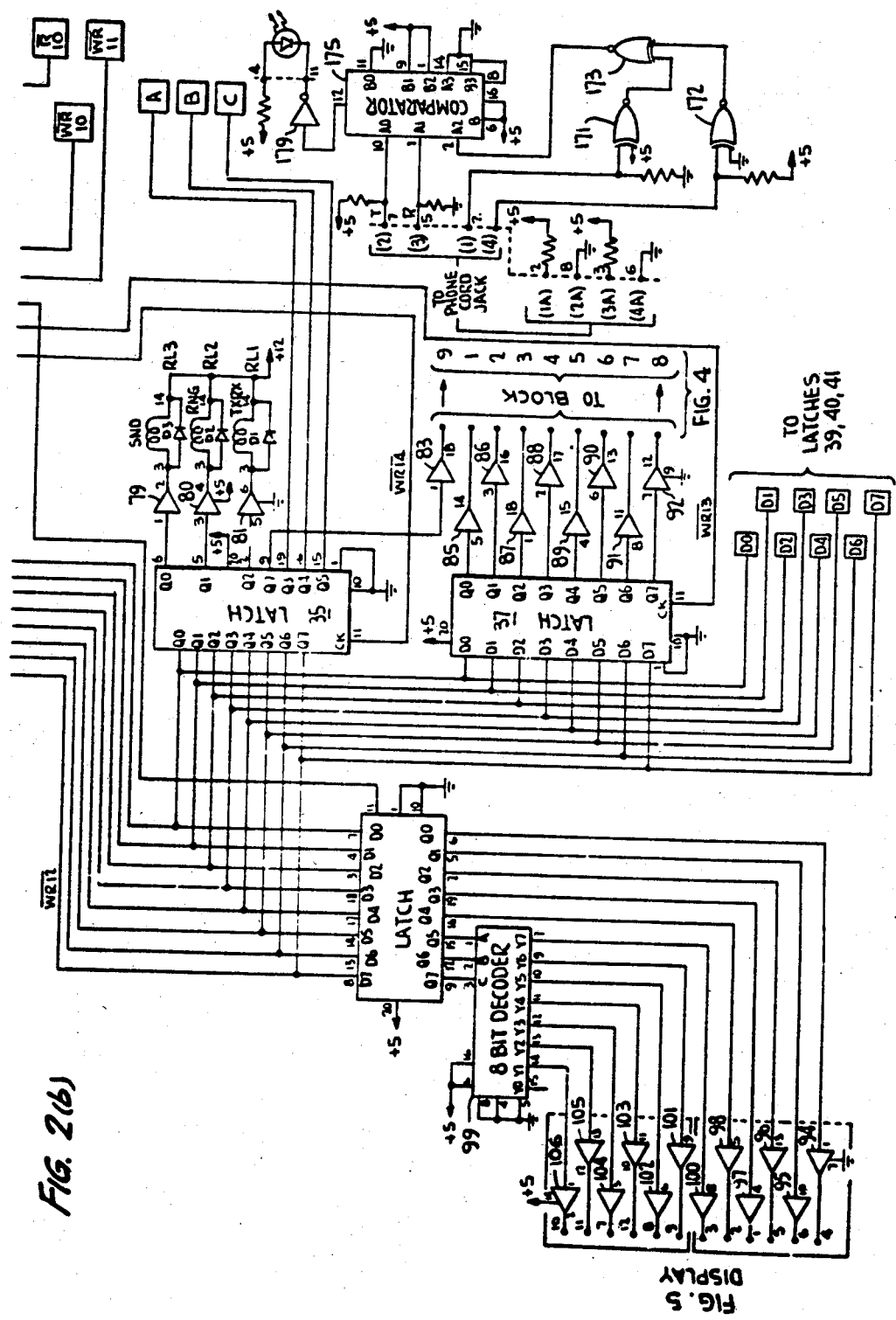

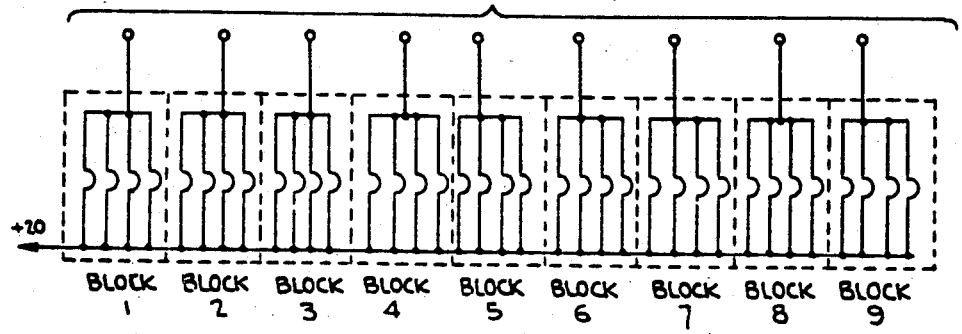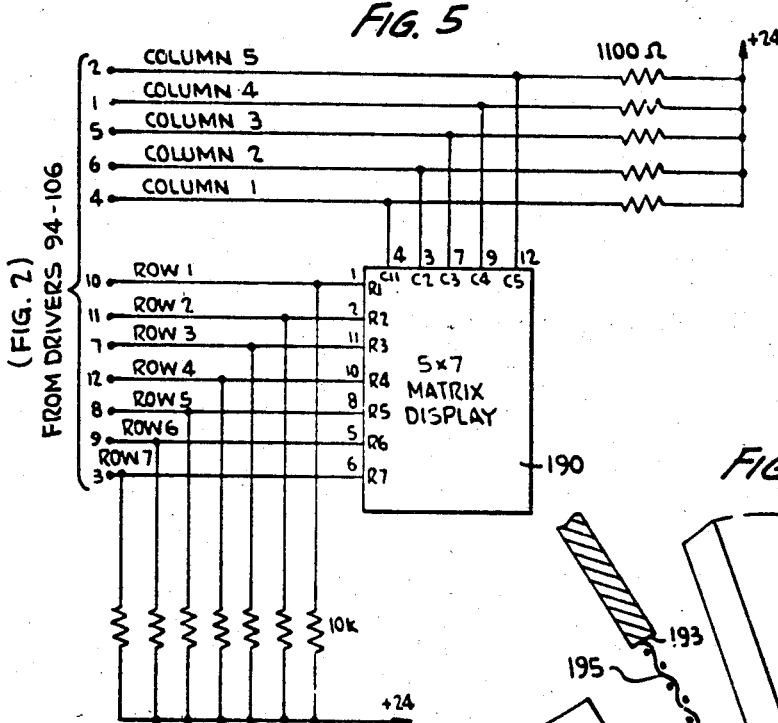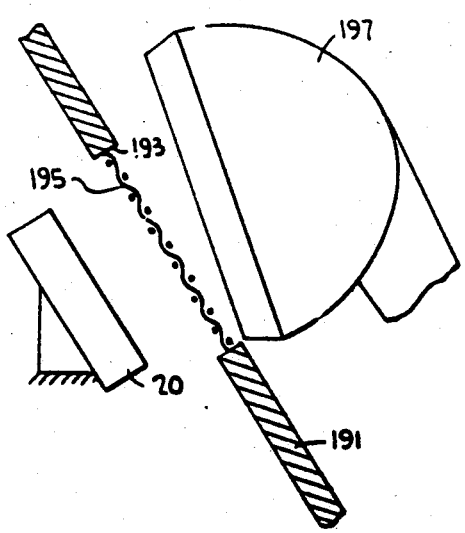

TELEPHONE TESTER

BACKGROUND OF THE INVENTION

1. Technical Field

The present invention relates to a method and apparatus for testing telephone sets. More particularly, the present invention relates to such a method and apparatus which can be used by unskilled consumers having no background in telephony.

2. The Prior Art

Prior art test units for telephone sets suffer from a number of practical disadvantages. One such disadvantage relates to the relatively high cost of such test units, which cost is often outside the price range of certain retail establishments which would employ the test units for its customers. In addition, existing telephone test units generally require trained personnel or technically-knowledgable operators to perform the test of the various operating parameters of a telephone set. In other words, an unskilled person cannot bring his or her telephone into a store and use the prior art test units; a trained sales person must do the testing. Further, some prior art testers, although purporting to be usable by unskilled consumers, require the user to make subjective determination as to the acceptability of certain operating parameters. For example, the user must determine if the sound received in the earpiece is loud enough; or the user must speak into the handset and the test unit must then determine whether or not the received volume is high enough, even though the level of the user's voice can vary from a whisper to a scream. Moreover, many telephone test units effect transmission tests by requiring that the mouthpiece/earpiece of the telephone under test be placed in an acoustic coupling device which does not fit all telephones, particularly the designer model phones which have become quite popular recently.

Generally, if a test unit for telephone sets is to be reliably used by untrained personnel, it must provide a minimal number of simple instructions and must not require any subjective evaluation of tests by the user.

OBJECTS AND SUMMARY OF THE INVENTION

It is therefore an object of the present invention to provide a relatively inexpensive method and apparatus for testing telephone sets, which method and apparatus can be easily employed by unskilled persons to test the operating parameters of their telephone sets.

It is another object of the present invention to provide a simple-to-use method and apparatus for testing telephone sets wherein an unskilled and untrained user can test a telephone set and have the status of the tested parameters determined entirely objectively by the method and apparatus.

It is a further object of the present invention to provide a method and apparatus for testing all models of telephone sets, irrespective of the shape and design of the hand set.

A further object of the present invention is to provide a test apparatus and method for objectively testing a telephone set for continuity, short circuits, rotary and push button dial operation, microphone operation, receiver operation and ringer operation, which method and apparatus can be used by an unskilled person having no knowledge or experience in telephone technology.

In accordance with the present invention, a telephone test set requires that the user know only how to read, plug a telephone line cord into a jack and operate a telephone set. A set of sequentially lighted graphic instructions, having both verbal and pictorial directions, direct the user to sequentially plug the telephone line cord into the test unit, press a start button, lift the telephone handset, dial digits indicated by the test unit, place the telephone mouthpiece at the test unit transducer, place the telephone earpiece at the test unit transducer, hang up the phone, press a test ringer button and unplug the phone. Each instruction, when complied with, results in a corresponding test of the telephone. If the telephone set under test passes the test, the next graphic instruction is lit. If a test is failed, a fail light is lit and instructs the user to seek the help of a clerk. For certain tests, improper responses by the user result in a lighted instruction to try the test again.

In the preferred embodiment, operation of the test unit is controlled by a microprocessor programmed to sequentially light the graphic instructions and to perform the various tests. In testing the dial mechanism, the test unit instructs the user to dial the zero digit and responds by determining if the telephone under test provides dial pulses or coded tones to represent the dialed digits. If dial pulsing is used, the test unit measures the dial speed, the dial pulse duty cycle (i.e., the make-break ratio of the pulses) and whether or not the proper number of pulses have been generated. If tone signalling is employed, the test unit determines if the tone frequencies correspond to those employed in the zero number code and also monitors other parameters of the tones. In either case, the monitored parameters are compared to functional standards to determine whether or not the parameters pass the test. After the dialed zero digit has been tested and passed, the test unit requests that each of the other digits (including the asterisk and pound symbols, if desired) be dialed in sequence and these are tested in the sequence dialed.

Transmission tests on the telephone being tested are effected by acoustically coupling the telephone mouthpiece/earpiece to a transducer at the tester. In testing the telephone mouthpiece, the test unit requests the user to place the mouthpiece on the test unit speaker (i.e. transducer) so that one or more tones generated in the test unit can be passed acoustically through the mouthpiece, into the telephone set and back through the telephone line cord to a tone receiver and detector in a test unit. Although a single tone can be utilized for this test, the preferred embodiment of the invention employs a pre-selected pair of the standard DTMF (Dual Tone Multiple Frequency) signalling tones. These tones are provided by a generator and detected by a receiver/discriminator which are required to be present in the test unit in order to test the DTMF dialing. The transmission test for the telephone earpiece requires that the latter be placed against the test unit transducer so as to transmit tones received by the line cord from the test unit. The same tone generator and receiver/discriminator are used for the earpiece test as are used for the mouthpiece test. Another feature of the transmission tests resides in the placement of the test unit transducer in a recessed position approximately three to three and one half inches behind a screen opening at the test unit panel surface. This recessed position compensates for errors due to the possibility of varied placement of the earpiece or the mouthpiece by the user. More specifically, if the test unit transducer were placed flush at the panel, and if the received tone test threshold were set accordingly, a mis-placement of the earpiece or the mouthpiece by only one-half inch from the panel surface would result in received tone level variations which render the testing to pre-established standards quite difficult, if not impossible. With the transducer recessed approximately three inches, a half-inch difference in placement of the earpiece or the mouthpiece from the transducer introduces a relatively small percentage error, on the order of 2 dB or less.

After the handset is returned to the on-hook position, the user is instructed to activate a ringer button which provides a ringer voltage to the phone via the line cord.

The test unit may also be provided with a circuit which automatically tests for continuity of the line cord and handset cord which may be plugged into suitably provided jacks on the test unit panel.

In an alternative embodiment, the sequentially lighted graphic instructions may be augmented or replaced by sequentially annunciated audible instructions.

BRIEF DESCRIPTION OF THE DRAWINGS

These and other objects, features and many of the attendant advantages of the invention will be better understood upon a reading of the following detailed description when considered in connection with the accompanying drawings wherein like parts in each of the several figures are identified by the same reference numerals, and wherein:

FIGS. 2a–2d are schematic diagrams of a preferred embodiment of the telephone test unit of the present invention;

FIG. 4 is a schematic diagram of the electrical circuit for lighting the graphic instructions of the front panel of FIG. 3;

FIG. 5 is a schematic diagram of the electrical circuit for energizing a 5×7 matrix display of a character which is displayed at the front panel of FIG. 3 for purposes of instructing a user to dial that character on the telephone under test; and FIG. 6 is a diagrammatic side view in partial section of a portion of the test unit which illustrates the transducer disposed behind the test unit panel.

DESCRIPTION OF THE PREFERRED EMBODIMENTS

Figure 1:
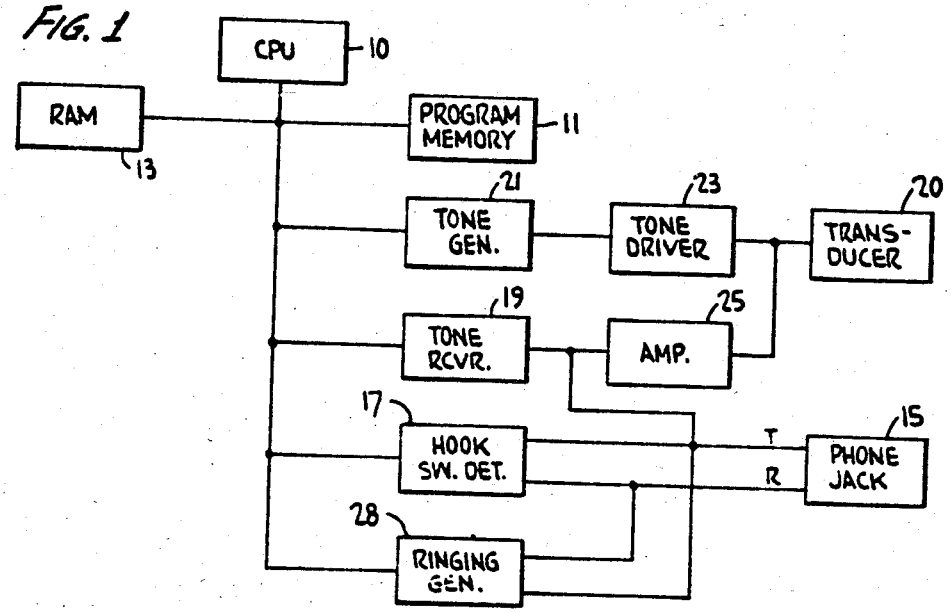
FIG. 1 is a functional block diagram of a telephone test unit of the present invention.

Referring specifically to FIG. 1 of the accompanying drawings, a telephone test unit according to the present invention is illustrated in functional block format. A central processing unit (CPU) 10 cooperates with a program memory 11 and a random access memory (RAM) 13 for data to control operation of the unit. The system, under the control of the CPU, is able to perform plural tests on a telephone set having its line cord plugged into phone jack 15 or otherwise connected to the test unit so that its tip T and ring R lines are connected as shown. A first test performed by the system, after the user lifts the hand set of the telephone under test, involved applying a voltage across the T and R lines at phone jack 15. Hook switch detection circuit 17 senses if the current resulting from the applied voltage is too high (signifying a short circuit in the line), too low (indicating an open circuit in the line) or representative of a normal off-hook condition. The NORM and the OC output signals from the hook switch detection unit 17 represent the normal and overcurrent conditions, respectively.

Once it is determined that a normal off-hook condition exists, the tester commands the user to dial the zero digit on the phone under test. The system automatically determines whether the dialed digit is coded in dial pulse or DTMF format. If a train of dial pulses is detected (i.e., an open circuit for each pulse), the pulses are counted and the entire coded digit is checked for proper number of pulses, dial speed and the duty cycle or make-break ratio of the pulses in the train. If DTMF tone signalling is used, the tone receiver is employed to detect whether or not the proper tones are received and whether or not the tones meet certain criteria with respect to amplitude, frequency, relative tone levels, etc. If a dialed digit results in a received signal having a parameter falling outside the prescribed specifications, the system provides a failure indication. Each dialed digit is tested in sequence in the same manner.

Upon successful completion of the dial test, the transmission test is initiated whereby a measurement is made of the capability of the telephone to transmit and receive voice signals. The user is first requested to place the telephone mouthpiece adjacent a speaker or transducer 20, and a tone generator 21 is simultaneously activated to deliver at least one audio tone to the transducer via tone driver amplifier 23. Although this test can be effected with a single tone, it is preferred that a pair of standard DTMF signalling tones be employed. These tones are derived from a standard and relatively inexpensive telephone signalling tone generator circuit and provide more accurate testing of the transmission characteristics of the telephone under test, particularly with respect to distortion. The audio tone or tones are converted into acoustic signals by transducer 20 and received at the mouthpiece of the telephone under test. The received acoustic signals are converted back to electrical signals by the telephone and are eventually transmitted back to the unit under test on the T and R lines via phone jack 15. These audio signals are eventually passed to the tone receiver 19 which monitors level, frequency and other parameters of interest. In the preferred embodiment, with a pair of DTMF signalling tones employed as the transmission test signal, the same tone receiver circuit 19 performs the identical function in detecting the transmission test signal as it performed in detecting the dial signal. This amounts to a considerable saving in cost and space.

Upon successful completion of the mouthpiece portion of the transmission test, the user is instructed to place the telephone earpiece adjacent to transducer 20. Tone generator 21 is activated to pass one or more audio tones to the telephone via jack 15 and the telephone line cord. These audio tones are converted to acoustic signals at the telephone earpiece, picked up by transducer 20 and passed through amplifier 25 to the tone receiver where the signal is tested. Again, use of a pair of standard DTMF signalling tones in this test permits common usage of the signal tone receiver and detection circuitry. In addition, the relatively inexpensive tone generator circuit can be employed.

After the transmission tests have been completed, the user is instructed to activate a ringer switch which causes ringing generator 20 to provide a ringing signal to the telephone under test via phone jack 15. The presence or absence of a ring is readily determined by the user.

Figure 2A:
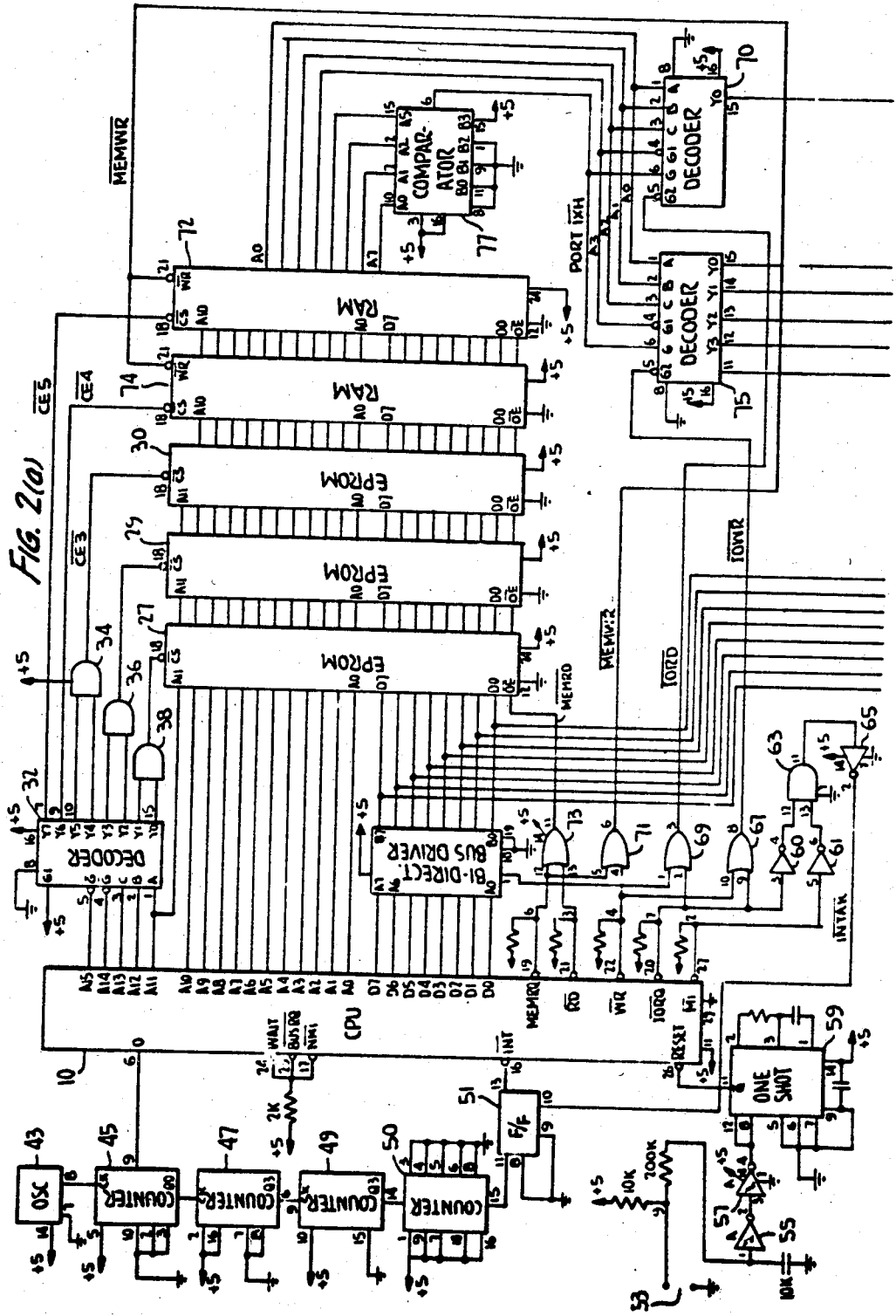
Figure 2C:
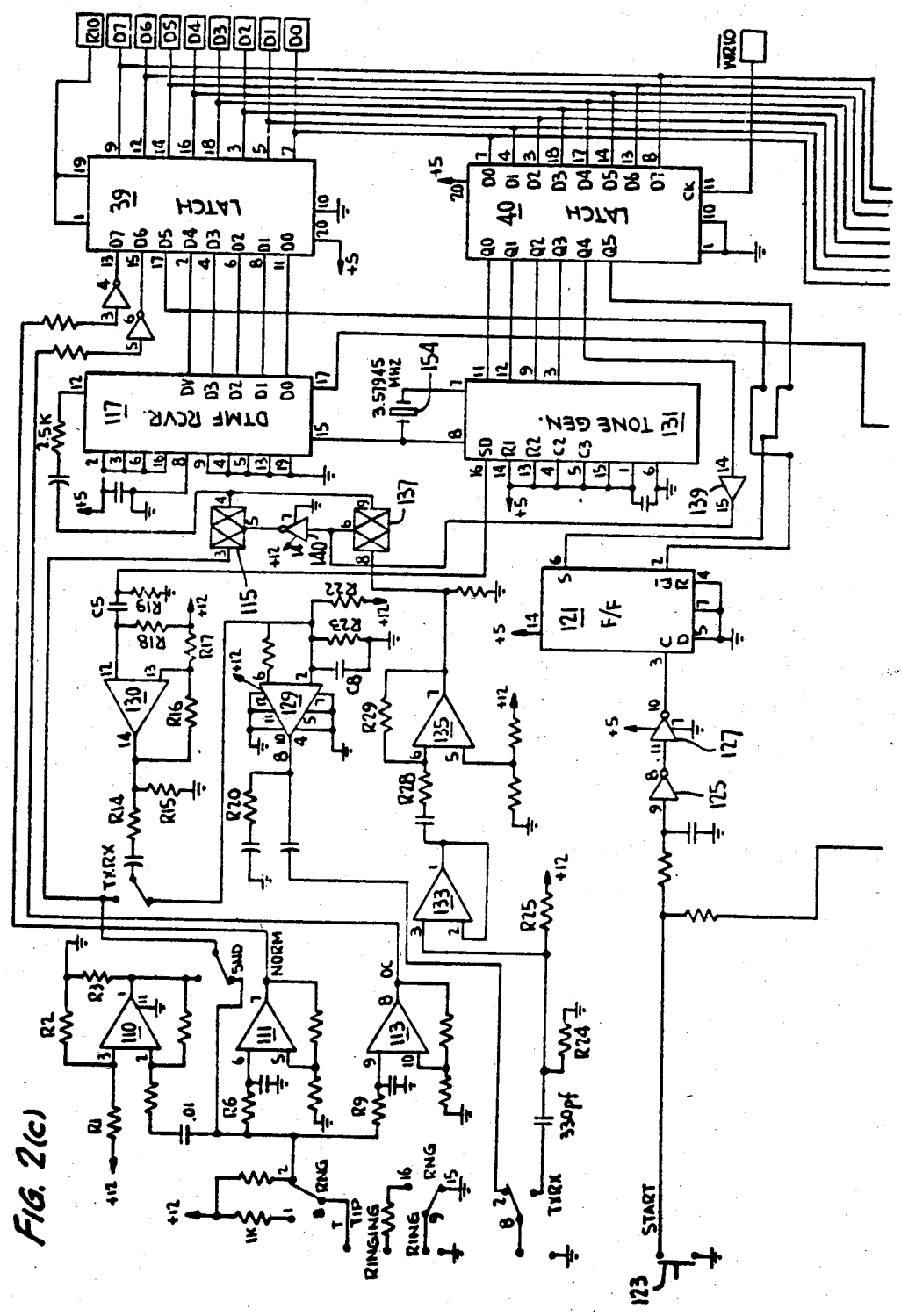
Figure 2D:
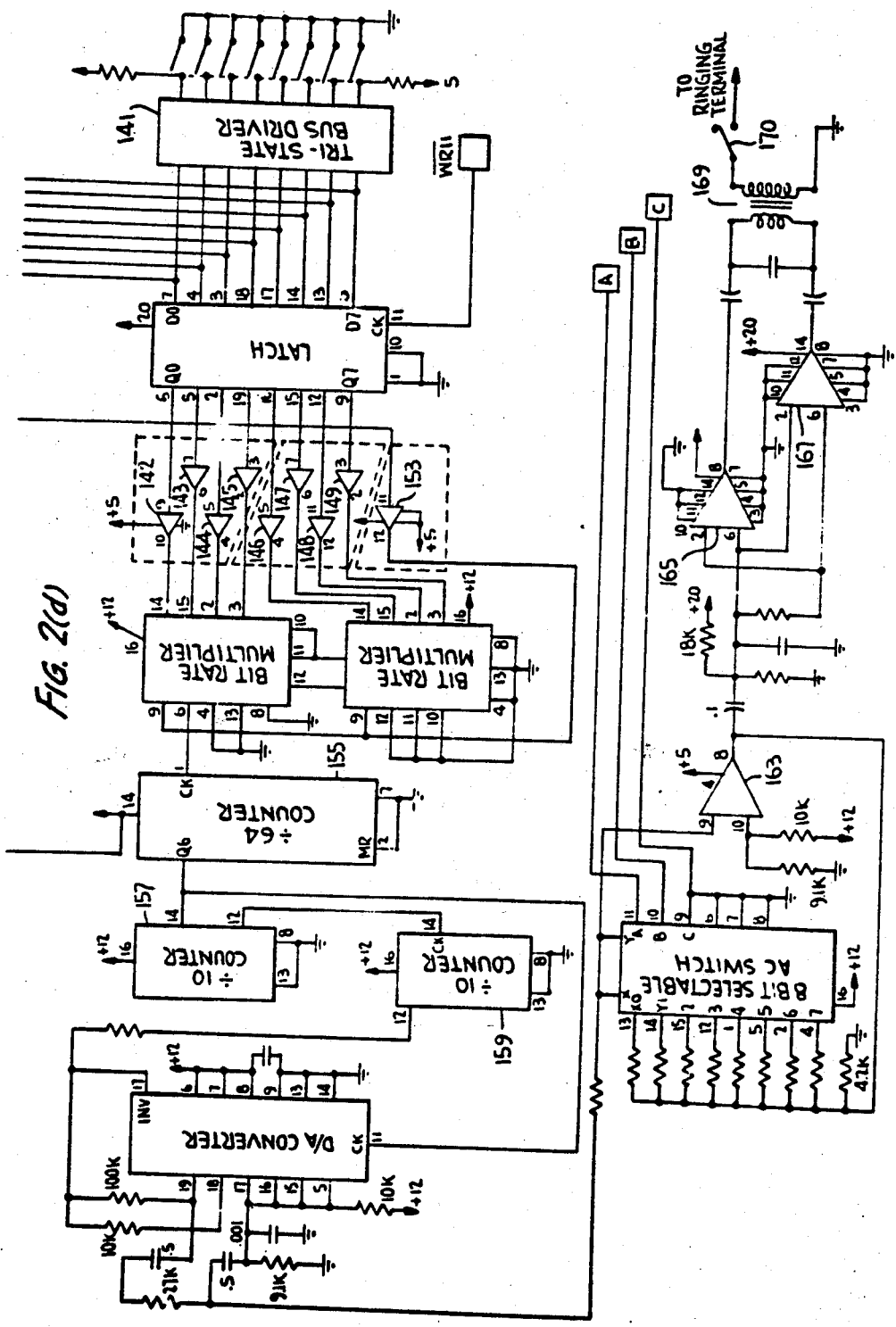

A detailed schematic diagram of the phone tester is illustrated in FIG. 2 to which specific reference is now made. CPU 10 has its address bits A0 through A11 coupled to an EPROM (erasable programmable memory) 27 which, along with EPROMs 29 and 30 connected in parallel constitute the program memory of FIG. 1. The other CPU address bit A11 through A15 are connected to an eight-bit decoder 32 which provides individual output signals Y0 through Y7 on its output lines, depending on the code represented by the logic states of A11 through A15 from the CPU. The Y0 through Y7 signals are used to select EPROMS 27, 29 and 30 and RAM units 72, 74 for operating under CPU control. In this regard, the Y7 and Y6 lines are connected directly to the chip selection terminals of RAM units 72 and 74, respectively. Address leads A0 through A10 from CPU 10 are connected in parallel to RAM units 72, and 74. The Y5 and Y4 signals are connected to AND gate 34 having an output signal connected to the chip select terminals of EPROM 30. The Y3 and Y2 signals are similarly applied to AND gate 36 which controls EPROM 29, and the Y1 and Y0 signals are applied to AND gate 38 which controls EPROM 27.

The data bits D0 through D7 of CPU 10 are connected to a bi-directional driver unit 31 having its transmission direction controlled by the state of the $\overline{RD}$ output line from CPU 10. The other side of driver unit 31 is coupled to the data terminals of EPROM 27, 29, 30, and RAM 72 and 74, and to eight-bit latches 33, 35, 37, 39, 40 and 41.

The interrupt request input terminal of CPU 10 receives a 1 KHz clock pulse signal derived from master oscillator 43, frequency dividers 45, 47, 49 and 50, and flip flop 51. The master oscillator provides a timing signal at 8 MHz. This frequency is divided by eight at counter 45 which also supplies the clock phase signal to CPU 10. The timing signal frequency is divided by ten at each of counters 47, 49 and 50 so that flip flop 51 is clocked at a 1 KHz rate. The Q output signal from flip flop 51 is inverted and applied to the INT (interrupt request) terminal of CPU 10.

The $\overline{IORQ}$ output signal and the $\overline{M1}$ output signal from CPU 10 are status signals representing an acknowledgment that the CPU has accepted the interrupt command. These signals are passed through respective inverters 60, 61 to AND gate 63 which operates through inverter 65 to reset flip flop 51 before the next 1 KHz pulse is applied thereto. This process of clearing flip flop 51 takes approximately ten microseconds.

The test procedure can be selectively reset at the CPU 10 by means of reset push button switch 53 which operates through inverters 55 and 57 to trigger one-shot multivibrator 59. The latter provides an output pulse which resets the CPU program to its start location. The CPU program for the present invention is listed in Appendix I and is described in detail hereinbelow.

The $\overline{IORQ}$ output signal from CPU 10 is also applied to one input of each of two-input OR gates 67 and 69. A second input to OR gate 67 is provided by the $\overline{WR}$ output signal from CPU 10 which is also applied to the two-input OR gate 71. The second input to OR gate 69 is derived from the CPU output signal $\overline{RD}$ which is also applied to a two-input OR gate 73. The second input for each of OR gate 71 and 73 is derived from the $\overline{MEMRQ}$ output signal of CPU 10.

The output signal from OR gate 73 is designated $\overline{MEMRD}$ and is applied to the $\overline{OE}$ terminal of EPROM 27 to gate data to the output terminals thereof. The output signal from OR gate 71 is designated $\overline{MEMWR}$ and is applied to the right terminal of RAM unit 72 and 74. These units correspond to RAM 13 of FIG. 1. The output signal from OR gate 69 is designated $\overline{IORD}$ and is applied to gate the operation of the read decoder 70. The $\overline{IOWR}$ output signal from OR gate 67, in turn, controls the write decoder 75.

Decoders 70 and 75 are read and write port decoders, respectively, and have their input lines connected to the A0 through A3 output lines of CPU unit 10. A four-bit magnitude comparator 77 has one set of inputs connected to the A4 through A7 output lines of CPU unit 10 and provide an output signal to each of decoders 70 and 75. Decoder 70 provides a read port output signal $\overline{R10}$; decoder 75 provides two write port output signals $\overline{WR10}$ and $\overline{WR11}$ as well as a $\overline{WR12}$ signal to clock latch 33, a $\overline{WR13}$ signal to clock latch 37, and a $\overline{WR14}$ signal to clock latch 15.

Figure 3:
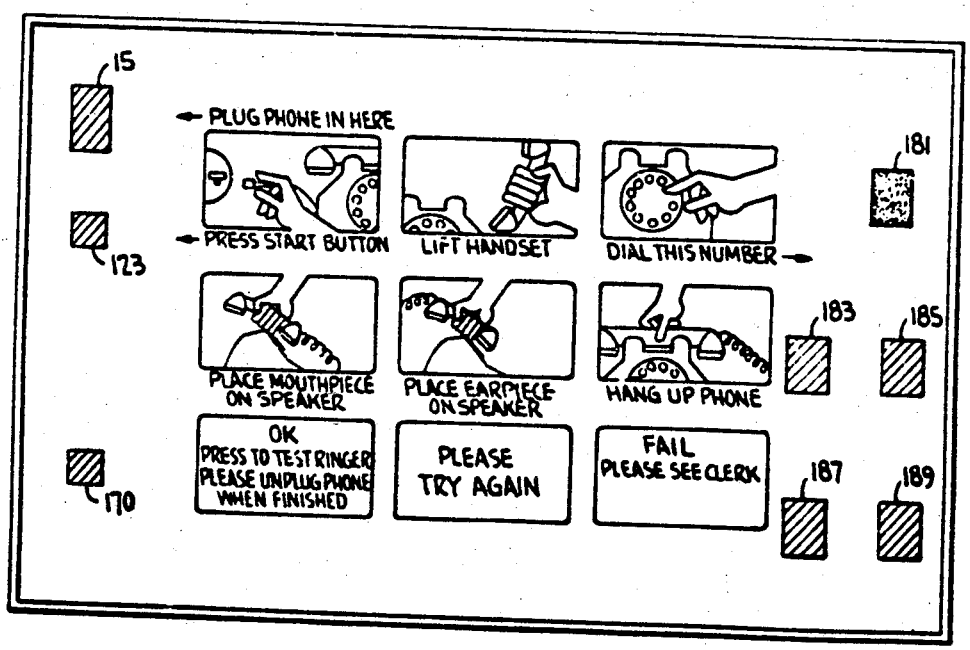
FIG. 3 is a plan view of a front panel of the telephone test unit of FIG. 2.

The Q0, Q1 and Q2 output signals from latch 35 are passed via respective drive amplifiers 79, 80 and 81 to control operating of the SND relay RL3, the RNG relay RL2 and the TXRX relay RL1. In addition, the Q3, Q4 and Q5 output signals from latch 35 are provided as the A, B and C port signals, respectively. The Q7 output signal from latch 35 is applied to driver 83 to control the failure display block 9 of the control panel as described below in relation to FIGS. 3 and 4. The Q0 through Q7 output signals from latch 37 are applied through respective drivers 83 through 92 to control the lighting of blocks 1 through 8, respectively, of the control panel, as illustrated in FIGS. 3 and 4.

Latch 33 is used to control the display of the character which is requested by the tester so that it may be dialed on the telephone set under test. Output bits Q0 through Q4 are fed via respective drivers 94–98 to respective column terminals of a 5×7 matrix display described below in relation to FIG. 5. The Q5–Q7 output bits of latch 33 are applied to an eight-bit decoder 99 which provides seven output bits through respective drivers 100–106 to respective row terminals of the 5×7 matrix illustrated in FIG. 5.

The T (tip) signal from phone jack 15 of FIG. 1 is connected to the arm of a contact of the RING relay RL2. In the normally closed position of this contact, the arm is connected through a resistor to +12 volts and is also coupled to the inverting input terminal of each of operational amplifiers 110, 111 and 113. More particularly, the normally closed contact of the RING relay is coupled: through a 0.01uf capacitor and resistor R5 to the inverting input terminal of operational amplifier 110; through resistor R6 and across a 0.1 uf capacitor to the inverting input terminal of operational amplifier 111; and through resistor R9 and across a 0.1uf capacitor to the inverting input terminal of operational amplifier 113. Resistors R1–R4 are associated with operational amplifier 110, resistors R7 and R8 with operational amplifier 111 and resistors R10 and R11 with operational amplifier 113 to provide the desired gains for these amplifiers.

The output signals from operational amplifier 110 is applied through the normally open contact of the SND relay RL3 and through a single stage a.c. switch 115 to DTMF receiver 117 which corresponds to the tone receiver 19 of FIG. 1. This signal path carries tone signals received on the line cord to the tone receiver unit where it is examined for specific parameters being tested.

Operational amplifiers 111 and 113 constitute a window comparator for the current level through the T and R lines in response to the applied voltage. The output signal from operational amplifier 11 is the NORM (current normal) signal and is applied via resistor R33 and inverter 119 to the D7 input terminal of latch 39. The OC (over current) signal is derived from operational amplifier 113 and is applied via resistor R34 and inverter 120 to the D6 input terminal of latch 39. The D0 through D3 terminals of latch 39 are connected to corresponding terminals at tone receiver 117; the D4 terminal at latch 39 receives the DV (data valid) signal from tone receiver 117. The D5 input bit of latch 39 receives its input signal from the $\overline{Q}$ terminal of flip flop 121 which is controlled by actuation of the START switch 123. This switch is a push button switch which momentarily drops the voltage to the clock terminal of flip flop 121 by grounding the voltage divider junction between resistor R32 and a 10K ohm resistor. The other end of resistor R32 is coupled across capacitor C10 and through series inverters 125, 127 to the flip flop clock terminal.

The RING (R) line is normally grounded through another normally closed contact of RNG relay RL2. When the RNG relay is energized, the T line receives 12 volts through a 1K ohm resistor while the RING line is resistively coupled to the RINGING line via a 9K ohm resistor.

The transducer or speaker 20 of FIG. 1 is shown in FIG. 2 as having one terminal permanently grounded and the other terminal connected to the arm of contacts of the TXRX relay RL1. In the normally closed condition of these contacts, the speaker receives the output signal from an operational amplifier 129 through a 470uf capacitor which, in turn, receives the signal across resistor R20 and 0.1uf capacitor connected in series to ground. Operational amplifier 129, which has resistor R20–R23 and capacitor C8 associated therewith to determine its gain characteristic, is driven by the output signal from operational amplifier 130 via normally closed contacts of the TXRX (transmit-receive) relay RL1. Specifically, the output signal from operational amplifier 130 is applied across resistor R15, through resistor R14 and a 0.1uf capacitor to the arm of the TXRX relay contact. Operational amplifier 130 has resistors R15 and R19 and capacitor C5 associated therewith to tailor its gain characteristic. The input signal applied to operational amplifier 130 is the output signal SD from the tone generator 131, which generator corresponds to tone generator 21 of FIG. 1.

Acoustic signals picked up by the speaker or transducer 20 of FIG. 1 are converted to electrical audio signals and, when the TXRX relay RL1 is energized, passed through normally closed contacts of that relay to the non-inverting input terminal of operational amplifier 133. Actually, the signal is passed through a 330 pf capacitor and across resistor R24 to the inverting input terminal of operational amplifier 133, which terminal is also resistively coupled to +12 volts d.c. via resistor R25. Operational amplifier 133 is part of a two-stage amplifier including operational amplifier 135 and resistors R26 through R29 and capacitor C9. The amplified signal is passed through single stage a.c. switch 137 to the signal input terminal of DTMF receiver 117 which analyzes the signl content. Switch 137 is controlled by data bit Q4 from latch 40 via driver 139 and is gated on in the mouthpiece portion of the transmission test. Switch 115 is controlled by the same signal, inverted by inverter 140, so that this switch can pass signal received from the line cord (i.e., across tip and ring) during the dial test and the earpiece portion of the transmission test.

The RINGING circuit, which is activated by CPU 10, includes latch 41 which receives a eight-bit code from the CPU on data lines D0 through D7 via a bi-directional bus. The code designates the particular ringing frequencies to be employed to test the ringer circuitry of the telephone under test. Since there are a variety of approaches to activating ringing circuitry, a universal ringer circuit must be able to effect all approaches. The philosphy employed in the present invention is to run through a program in which substantially all forms of ringing voltage are applied to the RINGING line and through the line cord via phone jack 15. The CPU, therefore, changes the code applied to latch 41 repeatedly during the program. A tri-state bus driver circuit 141 is also connected to the bi-directional data bus lines D0 through D7 and is controlled by respective individually-operable switches to permit one or more of the ringing codes to be eliminated from the ringing program. The CPU examines the status of the output bits of driver 141 to determine which codes to apply to latch 41. The eight output bits from latch 41 are applied to respective drivers 142–149. Drivers 142–145 feed respective input terminals A-D of a bit rate multiplier 150; drivers 146–149 feed respective input bits A-D of bit rate multiplier 151. The output terminal of the bit rate multiplier 151 is connected to the cascade input terminal of bit rate multiplier 150 so that the two units operate in cascade. The bit rate multipliers 150-151 count down the frequency of the clock pulse applied thereto via driver 153 from DTMF receiver 117. This clock is a timing signal derived from the crystal oscillator 154 having a base frequency of 3.579545 MHz. The output signal from bit rate multiplier 150 is applied to counter 155 where its frequency is divided by 64 and applied to the cascaded counter stages 157, 159 wherein the frequency is further divided by 100. A digital-to-analog converter 160, implemented as a switched capacitor band pass filter which filters the input square wave to a sine wave, converts the digital signal to analog and applies it to an eight-bit selectable a.c. switch 161 which operates as an adjustable gain unit. The ringing signal is then applied at operational amplifier stages 163, 165 and 167 before being applied to the primary winding of a step-up ringing transformer 169. The secondary winding of the transformer has one terminal grounded and the other terminal selectively connected to the RINGING line at phone jack 15 by means of ringing switch 170.

The system also includes a cord tester which permits the user to plug both ends of a line cord into one set of jacks and both ends of a handset cord to another set of jacks. The jacks are internally interconnected in parallel and are designated as pins (1), (2), (3) and (4), and (1A), (2A), (3A) and (4A). Phone cord testing is not controlled by the CPU and includes three exclusive OR (EX-OR) gates 171, 172, 173 and a four-bit magnitude comparator 175. EX-OR gate 171 has one input connected to +5 volts and the other input connected to pin (1) across a resistor 177 coupled to ground. EX-OR gate 172 has one input grounded and the other input connect to pin (4) and resistively coupled to +5 volts. The EX-OR gate 173 has as its two inputs the inverted output signal from gates 171 and 172. The output signal from EX-OR gate 173 is applied to the A2 input of comparator 175 so as to be compared to the B2 input which is connected to +5 volts. The A0 input of comparator 175 is connected to pin (2) of the phone cord jack so that the state of this pin may be compared to the grounded B0 input. The A1 input, which is compared to the B1 input at +5 volts, is derived from jack pin (2). The A3 and B3 inputs of comparator 175 are both grounded. If all four input signals at comparator 175 match, +5 volts appears at terminal 12 of the comparator to provide a ground at the output of inverter 179 which thereby causes lamp 180 to light.

Referring now to FIG. 3 of the accompanying drawings, the control and instruction panel of a tester according to the present invention is illustrated in detail. The phone jack 15 for receiving the line cord of a telephone under test is shown at the upper left hand corner of the panel. Below the phone jack are the START push button switch 123 and the RINGER switch 170. A 5×7 matrix lamp display 181 is provided in the upper right hand corner of the panel. This matrix display is described in greater detail below with reference to FIG. 5. A pair of jacks 183, 185 are disposed between the matrix display 181 and are adapted to receive the plugs at the end of a line cord for a telephone. Below these jacks are an additional pair of jacks 187, 189 which are adapted to receive the plugs and the end of a handset phone cord. Jacks 183 and 187 have their pin connections connected in parallel; jacks 185 and 189 likewise have their pin connections connected in parallel. These jacks are connected to the phone cord jack pins (1), (2), (3) and (4), and (1A), (2A), (3A) and (4A) described in relation to FIG. 2.

There are nine graphic display blocks numbers 1 through 9, respectively, disposed in three rows and three columns in the general center of the panel. Each block can be selectively illuminated under the control of CPU 10 in a manner described hereinbelow in relation to FIG. 4. Each block corresponds to an instruction or command to the user of the test system as part of the testing process of the user's telephone. Block 1 instructs the user to plug the line cord of the telephone under test into phone jack 15. This instruction, which is presented in both English and Spanish (as are the instructions associated with the other blocks) is accompanied by a graphic illustration of a hand plugging the line cord into a jack. Block 1 also instructs the user to press the START button 123 in order to initiate the test procedure.

Block 2 is an instruction to the user to lift the telephone handset, the instruction likewise being accompanied by a graphic representation of a handset being lifted from a telephone cradle. Block 3 instructs the user to dial a number which appears at the 5×7 matrix 181. A dial type telephone is illustrated as part of block 3 with a hand turning a rotary dial.

Block 4 instructs the user to place the mouthpiece of the handset on a speaker or transducer 20 which is described and illustrated in detail below with reference to FIG. 6. A hand is shown in block 4 holding a handset with the mouthpiece placed adjacent the transducer. Block 5 instructs the user to place the earpiece of the handset adjacent the speaker and likewise shows a hand holding the earpiece of a handset against the speaker or transducer.

Block 6 instructs the user to hang up the telephone and shows the handset being replaced on the telephone cradle. Block 7 indicates that the test has been successful by providing the letters "OK" and instructs the user to press the ringer switch 170. This, as described herein, causes the telephone to ring. Block 7 also instructs the user to unplug the telephone when finished.

Block 8 instructs the user to "please try again". This block is lit during the ocurse of the test procedure whenever the test unit determines that the procedure has not been properly followed. Block 9 lights up whenever a test procedure indicates that the telephone under test has failed one of the test procedures.

The sequential and selective lighting of the individual blocks 1–9 in FIG. 3 simply and effectively instruct a user to perform all of the necessary tests to determine whether or not a telephone is operating properly. As noted herein, all of the tests are monitored objectively by the test unit with the exception of the ringing test which requires that the user determine whether or not the telephone has rung. Uncertain conditions or improper action by the user result in the user being requested to try the last request again. If the telephone fails any test during the testing sequence, the failure block 9 is illuminated at the same time as the block designating the current test so that the user is aware of precisely which test has been failed. The user can then bring this fact to the attention of a sales clerk or a repair person.

Although not provided as part of the preferred embodiment disclosed herein, it will be appreciated that audible instructions may also be provided from the test unti to either accompany the lighted graphic displays or to repalce such displays altogether.

Referring specifically to FIG. 4 of the accompanying drawings, a circuit is illustrated whereby the individual graphic display blocks 1-14 9 of FIG. 3 are selectively illuminated. Each block has associated therewith four individual lamps A, B, C and D. the four lamps associated with each block are connected in parallel between +20 volts and the output terminal of a respective driver amplifier 83–92 illustrated in FIG. 2. When any of these driver amplifiers provides a low or ground output signal, the corresponding four lamps connected thereto are lit to illuminate the appropriate display block. With reference to FIG. 5 of the accompanying drawings, a 5×7 matrix display unit 190 is illustrated with its row and column connections thereto. These row and column connections derive from pins which are each connected to the output terminal of a respective driver amplifier 94–106. Each of the column connections is connected to +24 volts through an 1100 ohm resistor; the row pins are connected to +24 volts through respective 10K ohm resistors. The drivers 94–106 are illustrated in FIG. 2 and derive the matrix display data from latch 33 and the eight-bit decoder 99.

Referring now to FIG. 6 of the accompanying drawings, a portion of a wall or panel 191 of the tester unit is illustrated with transducer or speaker 20 mounted behind a suitable opening 193 in the panel. Opening 193 is covered with a sound-transmitting screen or mesh 195. Transducer 20 is spaced behind panel 190 and from screen 195 by a predetermined distance. This spacing, rather than having transducer 20 mounted flush with panel 191, constitutes one of the important aspects of the present invention. More specifically, when the earpiece or mouth piece 197 of a telephone handset is placed against a speaker or transducer, the placement of the earpiece or mouthpiece is not always accurate. For example, the earpiece or mouthpiece may not be placed flush against the panel or it may be turned at an angle relative to the panel so that only a portion of the earpiece or mouthpiece is in contact with the panel. Since attenuation of acoustic energy through the air varies as a square law function, a spacing difference of only one-half inch constitutes a relatively large percentage of the normal spacing between the earpiece or mouthpiece and the transducer when the transducer is mounted flush with the panel. The present invention overcomes this problem by recessing or spacing the transducer 20 from the panel 191 by a predetermined distance. This distance is preferably in the range of approximately three to three and one-half inches. With such an arrangement, as illustrated in FIG. 6, slight misplacement of the earpiece or mouthpiece 197 results in a relatively small percentage change in the received level at the transducer or in the level received from the transducer. More specifically, a half inch misplacement of the earpiece or mouthpiece results in an error of less than 2 dB. On the other hand, when transducer 20 is mounted flush with the panel 191, a one half inch misplacement of the earpiece or mouthpiece can result in more than 12 dB of error.

The operation of the test apparatus is described hereinbelow with reference to the flow chart set forth in Appendix I for CPU 10. The description which follows describes each of the flow chart steps in sequence in relation to the various elements of the drawings which take part in those steps.

When the system is first turned on, data from CPU 10 is passed through bi-directional bus driver 31 to latch 37 where the Q0 output bit causes graphic display block 1 to become illuminated. The $\overline{WR13}$ port controls this operation. The system then waits for the START switch 123 to be actuated by looking at bit D5 at latch 40 under the control of the $\overline{WR10}$ port. The state of bit D5 at latch 40 is controlled by flip flop 121 which is switched upon actuation of START switch 123. When the START switch is actuated, the $\overline{WR13}$ port signal controls latch 37 to turn off the lamps at display block 1. The $\overline{WR10}$ port signal operates at latch 40 to reset the START switch indication at bit D5 and then enable the latch again to see if the reset switch is still depressed. It should be noted that operation of the system permits various test steps in the sequence to be skipped if the user presses the START switch a number of times in succession. For example, if the user wishes to proceed immediately to the ringer test designated by graphic display block 7, six successive actuations of the START switch 123 will cause the graphic displays at blocks 2, 3, 4, 5, 6 and 7 to light successively. The tests corresponding to those performed when blocks 2-6 are lit are skipped under such circumstances.

Returning to step 5 of the flow chart, block 2, instructing the user to lift the handset, is illuminated under the control of the $\overline{WR13}$ signal at latch 37. The Q1 output signal from this latch controls illumination of block 2. In addition, the six second timer in CPU 10 is initiated. This six second timer is operated under the control of the interrupt signal provided at a 1 KHz rate from flip flop 51. More particularly, a count of 6000 is stored in an appropriate memory location and examined each millisecond upon the occurrence of an interrupt pulse. Upon each examination, the count is decremented and returned to the storage location. After the six second timer is set by inserting the count 6000 into the appropriate memory location, the system proceeds to perform a continuity test. The first poriton of this, as described at flow chart step 6, is to determine whether or not there is an over current condition as sensed as operational amplifier 113 from the signal appearing on the T terminal. The OC output signal from operational amplifier 113 is applied to bit D6 at latch 39 under the control of the $\overline{R10}$ signal. If an over current condition is sensed, the program proceeds to the fail sub-routine described hereinbelow. Assuming there is no over current condition, the program proceeds to flow chart step 8 and checks for a normal current condition as sensed at the output terminal of operational amplifier 111. The NORM output signal from this amplifier is applied to bit D7 at latch 39 and the status of this bit is transferred for examination by the CPU 10 under the control of the $\overline{R10}$ signal. If the NORM signal is true, the flow chart program jumps to step 15 and proceeds to the next test in the multi-test sequence. Absence of a true NORM signal causes the flow chart to proceed to step 10 wherein an examination of the status of the START switch is checked in order to see if the operator is stepping the START switch to bypass steps in the procedure. If the status of the START switch of bit D5 as sensed at latch 39 under the control of the $\overline{R10}$ signal is true, then the program skips to step 15. If the START switch status is not true, the system examines the status of the six second timer to determine whether or not it has timed out to zero. If it has not, the program jumps from step 14 back to step 6 and repeats the sequence of steps under the control of the "try again" sub-routine described hereinbelow. Basically, the "try again" sub-rutine causes graphic display box 8 to be illuminated and the system proceeds to check for continuity once again.

Assuming the system proceeds to flow chart step 15, the START switch status is reset at latch 40 under the control of the $\overline{WR10}$ signal. Graphic display block 2 is then extinguished and block 3 is illuminated under the control of $\overline{WR13}$ at latch 37. Graphic display block 3 instructs the user to dial the number displayed at the 5×7 matrix 181.

Before proceeding with the discussion of the dial test procedure, it should be noted that the philosophy involved in the continuity tests essentially involves a comparison for minimum and maximum current by applying d.c. voltages, similar to those applied by the central office, to the line cord. The system determines that the telepone is off hook, is not shorted, and is not open or at too high a resistance for the telephone set to properly function. In effect, the continuity test constitutes a window comparison for d.c. current in response to applied voltage. If the continuity test criteria are satisfied, the system automatically proceeds to the dial test.

The dial test philosophy involves a determination as to whether the telephone under test provides dial signal as a coded pulse train or as a pair of tones in DTMF format. This is achieved by directing the user to dial the digit "0" on the phone under test. If a pulse code is detected, wherein each pulse in the dialed pulse train code is in open circuit, the system responds by checking for dial speed, the proper count of pulses in the dialed digit, and whether or not the make-break ratio of the individual pulses in the train meet specification. The reason for not starting with the digit "1" is that the user may have jiggled the handset as it was picked off the cradle in response to the instruction in graphic display block 2. This jiggling can appear as a "1" digit dialed on the phone. The system, therefore, provides a built-in delay after the instruction to remove the handset, long enough to ignore such fumbles by the user. In addition, a make-break ratio test cannot be performed on the digit "1" because the pulse code for this digit appears as an indefinite closed state followed by approximately sixty milliseconds of open state followed by an indefinitely closed state; in other words, there is no ratio to detect. The "0" digit is, therefore, ideally suited for the make-break ratio test.

The dial pulses in the requested "0" digit are counted and the speed of the pulses and the make-break ratio are checked against telephone company criteria. The system looks to see if the first pulse in the "0" digit is open for the right period of time and then takes an average of the open time versus the closed time in order to determine the desired ratio. This is achieved by sampling the dial pulse every millisecond at the time of the interrupt pulse and storing the sampled value. After the last pulse, which occurs about 1.2 seconds after the first pulse in the "0" digit pulse train, the test unit determines whether or not the telephone has failed the dial test. The end of the pulse train is determined when the NORM signal from operational amplifier 11 remains true at latch 39 for a predetermined period of time. The status of this NORM signal is read every millisecond at latch 39 under the control of the $\overline{R10}$ signal.

It is to be noted that some telephones have push-button dials but are not DTMF in format. These phones convert the button actuation to equivalent dial pulse trains. This requires the test unit to distinguish between dial pulses versus DTMF and cannot rely on a user to set this distinction into the tester. For that reason, the tester is required to automatically determine whether or not a pulse train or DTMF coding is received.

As noted above, the NORM signal is examined to determine whether dial pulses are present. This signal is true when the telephone is off-hook. The interrupt signal causes the read port $\overline{R10}$ to provide a level from decoder 70 to effect a read function at latch 39 and cause all bits at latch 39 to be read into the CPU memory. However, all of these bits except D7 are discarded. Data lines D0 through D7 terminate at driver 31 and are applied to the CPU under the control of the $\overline{RD}$ output signal from the CPU. The system stores only the D7 status in RAM 74. When the more than 1000 samples of the NORM signal are thusly stored for the "0" digit pulse train, these samples can be analyzed to determine if the various parameters of the dialed pulse meet specification. The system first checks the time of the pulse to see if it is within the minimum/maximum specification. It also checks the ratio of the first pulse to see if the make-break ratio meets specification. The average of all pulses is then computed to determine the speed of the dial and then all of the on-times and off-times are examined to achieve the overall make-break ratio. These same tests are repeated for each of digits 1-9. It is to be noted, however, that the user can skip the remaining digits, if desired, by merely actuating the START switch to step the system to the next test.

If the dialing code format is detected as being DTMF, the NORM signal does not become true at latch 39; instead, the DTMF receiver 117 receives the output signal from operational amplifier 110 via the SND relay contact and switch 115. If a proper tone pair is received at receiver 117, and if the tone pair meets the prescribed specifications, the DV output bit from the receiver goes true. This indicates that the data is valid on data bits D0-D3. The DTMF receiver 117 has a dial tone notch filter therein to take out dial tone which might be present. It also includes two band split filters which split the incoming signal into upper and lower frequency groups, it being noted that there is always one tone of a proper pair in each of the two groups. A counter counts the frequency to see if it is correct, in each group so that a determination can be made if the tones in each group correspond to one of the four specified tones. The DTMF receiver is a standard chip which is able to check dB levels, frequencies, twist, and other tone parameters.

The signals stored in latch 39 can change any time under the control of the signals applied thereto. If a valid digit (DV) is detected at DTMF receiver 117, a hexadecimal A (or 10) appears at D0-D3. The $\overline{R10}$ signal reads the status of latch 39 at interrupt time to determine whether or not bit D4 is true, thereby indicating a data valid condition at the output of the DTMF receiver 117. If a data valid condition exists, the D0-D3 bits are compared to the number requested to be dialed and if that number is not present, the "try again" sub-routine is executed. If a proper number is detected, no further tests are required because the DV true indication indicates that the tones received by receiver 117 are within specification.

This dial test philosphy can be related to the flow chart program in Appendix I by returning back to step 17 wherein, as described above, the block 3 is illuminated to instruct the user to dial a "0" on the telephone under test. The corresponding DTMF tone pair, namely 1633 Hz and 1209 Hz, are then turned on at tone generator 31 and applied to the DTMF receiver 117. This operation is effected by delivering the data to latch 40 and selecting that latch for operation by means of the $\overline{WOR10}$ signal. The program then proceeds to step 19 whereby the digit "0" is placed in the 5×7 matrix 181. This is effected by the $\overline{WR12}$ signal applied to latch 33 to thereby transfer the data bits from the CPU 10 through the eight-bit decoder and drivers 94-106 to the 5×7 matrix display illustrated in FIG. 5. This display is constantly refreshed by cyclically energizing one row at a time in the matrix, with only those columns being activated in each energized row so that the appropriate character appears in the matrix. The repetition frequency of this repetitive refreshing is sufficiently high so as to appear to the naked eye as a constant display of the selected character.

The program next sequences to step 20 wherein a determination is made as to whether the dialed number is DTMF or dial pulse (DP). This is effected under the control of the $\overline{R10}$ signal at latch 39 which particularly examines the D70 and D40 bits. The next check is the status of the START switch at bit D5 of latch 39 under the control of the $\overline{R10}$ signal. If the START switch is true, then, in accordance with instruction 21A, the program jumps to step 23, bypassing the rest of the dial tone test procedure and jumping to the next test in sequence. This would occur when the operator has re-actuated the START switch 123 in order to bypass the dial test. At step 22, if a dial pulse is detected at bit D7 at latch 39, the program jumps to the dial pulse test sub-routine listed at the end of the Appendix I flow chart. The steps listed in that sub-routine are self-explanatory in view of the description provided above under the philosophy employed for the dial pulse test.

Referring to flow chart step 22A, if a valid DTMF code is received, as indicated at bit D4 at latch 39, the program jumps to the DTMF test sub-routine which immediately preceeds the dial pulse test sub-routine near the end of Appendix I. At the successful completion of a DTMF test or dial pulse test, the programs returns to flow chart step 23 whereby the 1209 Hz tone is turned off and the 941 Hz tone is turned on at the tone generator 131 under the control of the $\overline{\text{WR10}}$ signal at latch 40. The graphic display block 3 is then turned off under the control of $\overline{\text{WOR13}}$ at latch 37 and the 5×7 matrix is turned off under the control of the $\overline{\text{WR12}}$ signal at latch 33. The system then proceeds to the next set of tests which are designated the transmission tests.

The transmission tests monitor the ability of the telephone under test to transmit and receive audio signal. As noted hereinabove, the present invention employs a two tone DTMF test whereby a pair of standard signalling tones is transmitted through the telephone and received back at the tester to determine whether or not too much loss or distortion occurred in the transmission through the telephone. It should be noted that a single frequency test may be employed. Such a single frequency test would employ a narrow band filter so as to eliminate the need for an acoustic coupler. Specifically, an acoustic coupler blocks out ambient noise and compensates for any variable spacing between the earpiece or mouthpiece from an adjacent transducer. The acoustic coupler can be eliminated by having a bandpass filter with sharp skirts tuned to the single test frequency. Such fitler excludes most room noises and provides an improved signal-to-noise ratio for the test. Such a test detects only gross distortion in the telepone set under test because some of the distortion will fall outside the pass band of the narrow band filter. The advantage of the narrow band test is to defeat surrounding noise and eliminate the need for close acoustic coupling which is undesirable for non-standard handsets and unskilled users.

The DTMF transmission test employed in the preferred embodiment is an improvement over the single tone test in that it repalces the specialized hardware of the tone generator, narrow band filter and detector with a standard DTMF generator which is relatively inexpensive. the DTMF receiver 117, already present for testing dial signalling, can be employed in the transmission test. Moreover, a two-tone test is more accurate in monitoring distortion than is a single tone test. The transmission test is thereby performed very inexpensively and with a high degree of accuracy, a combination which as not been possible in the prior art.

The transmissin test involves testing both reception of acoustic signals at the mouthpiece and transmission of acoustic signals from the earpiece. When the telephone set mouthpiece is placed against the transducer 20, a pair of tones is provided at the SD terminal of tone generator 131 and is passed through operational amplifier 130, the normally closed contacts of the TXRX relay, operational amplifier 129, and another pair of normally open contacts of the TXRX relay to the speaker or transducer 20. The signals received by the mouthpiece of the telephone under test are passed through the telephone to the line cord and transmitted back across the T and R terminals of the test unit. The signal thusly received at the test unit is applied through operational amplifier 110 and switch 115 to the DTMF receiver 117. This received signal is fully and automatically evaluated at the DTMF receiver which provides its output signals to latch 39 in order to determine whether or not a proper transmission has been made.

When the earpiece of the telephone under test is placed against the speaker or transducer 20, the output tone pair from tone generator 131 passes through operational amplifier 130, the normally open contacts of TXRX relay Rl1, the normally closed contacts of the SND relay RL3 and normally closed contacts of the RNG relay to the tip terminal T. The signal is then transmitted through the line cord to the telephone under test and back out through the earpiece to transducer 20. The signal detected by transducer 20 is applied through the normally open contacts of the TXRX relay to operational amplifier 133 and then through operational amplifier 135 to switch 137 from which point it is applied to the DTMF receiver. As noted above, this receiver 117 fully tests the received tones to determine whether or not they meet the pre-established specifications.

From the foregoing, it is noted that an objective transmission test is readily attained within an accuracy of a few dB. The same tone generator and receiver are employed as is other common circuitry, for both the mouthpiece and earpiece tests, the main difference being that the TXRX relay is energized for the earpiece test.

Turning to a description of the flow chart steps, particularly to step 26, block 4 is illuminated at the graphic display panel under the control of the $\overline{\text{WR13}}$ signal applied to latch 37. The START switch status is then reset under the control of the $\overline{\text{WR10}}$ signal at latch 40 to provide the appropriate signal to flip flop 121. The START swtich status is then enabled at the same flip flop so that the transmission test can be skipped if the user has decided to do so by once again actuating the START switch 123. If the START switch is not re-actuated, the SND relay is energized at latch 35 under the control of the $\overline{\text{WR14}}$ signal. Actuation of the SND or send relay sets up the circuit so that tones can be revceived from the line cord and transmitted to the mouthpiece of the telephone set under test via transducer 20. The six second timer in the CPU 10 is then set at step 30 and the status of the START switch 123 is checked at latch 39. If the START switch state is true, idicating that the user wishes to bypass the transmission test, the program jumps to step 37. If it is not true, the status of the output bit of the DTMF receiver 117 is checked at latch 39 under the control of the $\overline{\text{R10}}$ signal to determine whether or not the 1209 Hz and 941 Hz pair has been received. If this pair is received, the program jumps to the next test at step 37. If it is not received, the six second timer count is detrimented and checked to see if the count is zero. If it is zero, then the "try again" sub-routine is initiated. If the six second timer count is not zero, the program goes back to step 31 and stays in the routine between steps 31 and 36 until the six second timer count reaches zero or the appropriate tone pair has been received.

Beginning at step 37 of the flow chart, the START switch status is reset and then enabled as described above. Graphic display block 4 is extinguished and graphic display block 5 is illuminated under the control of the $\overline{\text{WR13}}$ signal at latch 37. The graphic display block 5 instructs the user to place the earpiece of the telephone handset at transducer 20. At flow chart step 40A, the SND relay RL3 is de-energized under the control of latch 35 and $\overline{\text{WR14}}$. In addition, the TXRX relay is energized at the same control location. The six second timer count is set at the CPU and the number of tries for the "try again" sub-routine is set at four. At step 42, the status of the START switch 123 is checked at latch 39 and if true, the program jumps to flow chart step 49, thereby bypassing the earpiece test. If the START switch status is not true, the DTMF receiver 117 is checked to determine whether or not the appropriate tones are present at the output bits which are registered in latch 39. If the appropriate tones are received, the program jumps to flow chart step 49. If the appropriate tones are not received, the six second counter is decremented and tested to determine whether a zero count is present. If a zero count is present, the "try again" sub-routine is actuated. If the six second count is not zero, the program jumps back to step 42 and repeats the subsequent steps.

The steps beginning at flow chart step 49 relate to a hang-up test initiated simultaneously with the instruction to the user to hang up the handset. The hang-up test makes sure that the phone can, in fact, be placed back on hook. In the test procedure described above, it is understood that the test unit cannot prevent a user, when pressing the start button, from already being off-hook. However, a telephone set failure may be due to not being able to go on-hook, a situation wherein a telephone cannot receive incoming calls. Therefore, the hang-up test is made at this time. It is performed by looking at the NORM signal after the handset is hung up. The NORM signal should always be false at this point of time.

Referring to the flow chart steps in Appendix I, at step 49, the START switch status is reset and then the status is enabled at step 50 to permit the hang-up test to be bypassed under the control of the user's actuation of START switch 123. Graphic display block 5 is extinguished and block 6 is illuminated under the control of the $\overline{WR13}$ signal at latch 37. Block 6 instructs the user to hang up the telephone. The TXRX relay is de-energized under the control of the $\overline{WR14}$ signal at latch 35 and the state of the a.c. switches 115 and 137 is changed by data bit Q4 at latch 40 under the control of $\overline{WR10}$ signal. At step 55, the $\overline{WR10}$ signal controls latch 40, particularly bits D0 through D3, to turn on the 1209 and 1633 Hz tones and turn off the 941 Hz tone. The count for the six second counter is then set and the status of the START switch 123 is checked to determine if the program is to be jumped to the next test procedure beginning at step 4. At step 59, the system monitors the status of the NORM signal at latch 39, bit D7, under the control of the $\overline{R10}$ signal. If the NORM signal is absent, indicating that the telephone is on-hook, the procedure jumps to step 64. If not, the six second counter is decremented and the count is checked for a zero state. If a zero state exists, then the "try again" sub-routine is entered. If the six second counter is not at the zero count state, the program returns to step 57 and repeats.

The next group of flow chart steps relate to testing the telephone ringer. Since not all telephones ring, the ringer test must be relatively subjective in that the user must determine whether or not the proper operation has ensued. Certainly, the tester cannot know if the telephone rang. The test unit of the present invention provides a ringer test switch 170 which permits the user to selectively apply the signals from transformer 169 to the line cord plugged into phone jack 15. If the phone does not ring, and if the telephone is designed to ring, the user will immediately know that the ringer circuit is inoperative.

There are a variety of different types of signals used to effect ringing in commercially available telephones. The simplest approach is placing an a.c. voltage across the tip and ring lines. Other systems employ frequency selective ringing in which one of plural different frequencies is placed across the tip and ring lines and the ringer is electrically or mechanically resonant to one of these frequencies. Generally, these frequencies reside in the range from 16 to 66⅔ Hz. Other approaches have also been employed. In order to provide ringer circuit testing on a substantially universal basis, a telephone test unit must be able to apply each and every one of the different types of signals employed in commercial telephones to effect the ringing. The present invention employs a CPU-controlled sine wave synthesizer to generate any frequency necessary to effect ringing. A relay applies that frequency from tip (T) to ground or from ring (R) to ground. The CPU runs through all combinations of ring frequency signals and, when the ring switch 170 is actuated, applies these signals in sequence to the telephone line cord.

The tri-state bus driver 141 and its associated switches, as described above, permit certain combinations of the ringing frequencies to be eliminated. This is desirable, for example, if a retail store in which the test unit is located in a geographic area where only one or two of the ringing frequencies is used. The store operator can thereby select only the applicable frequencies by throwing the appropriate switches connected to the bus driver 141. This eliminates a good portion of unnecessary sine wave synthesis under the control of the CPU. The processor provides a code to the latch 41 representing a particular frequency. This code can represent frequencies in 0.27 Hz increments from 0 to 69 Hz. In effect, the processor can run through all of these possibilities in a short period of time to effect the entire spectrum of ringing tones; however, only a limited number of ringing frequencies are selected in accordance with the frequencies used in standard telephony practice. The drivers 142–149 at the output of latch 41 serve as a converter between TTL and CMOS logic, and drive the bit rate multipliers 150 and 151. The bit rate multipliers count down the frequency applied thereto from the DTMF receiver 117. The frequency is divided by 64 at counter 155 and again by 100 at cascaded counters 157 and 159. The digital signal is converted to analog form by the digital-to-analog converter 160. The output signal from the digital-to-analog converter is applied to an eight-bit selectable a.c switch 161 which operates as an adjustable gain device. Specifically, by selecting the resistors in the circuit by means of signal lines A, B and C, the gain of unit 161 can be selectively controlled. The output signal from the switch 161 is applied through amplifiers 163, 165 and 167 across the primary winding of transformer 169. The ring tone is stepped up in transformer 169 and selectively applied to the ringing terminal and the telephone line cord by switch 170.

The software runs through all of the frequencies that could possibly be employed to ring a commercial telephone. The state of the switches associated with the tri-state bus driver 141 is sensed by the computer which sends only those codes which correspond to the selected ringing sequence.

Referring to step 64 in the flow chart sequence, the ring test is initiated, as are the other tests, by first resetting the status of the START switch and enabling that status at latch 40. Graphic display block 6 is extinguished and block 7 is illuminated under the control of $\overline{WR13}$ at latch 37. A sixty second timer count is set up in the CPU and the status of the START switch is observed to see if START switch 123 is actuated. The ring relay RL2 is actuated at latch 35 under the control of the $\overline{WR14}$ signal and the ringing codes are then automatically sequenced under CPU control.

The "try again" sub-routine and the fail sub-routine are substantially straight forwardly described in the flow chart and are not repeated here. It should be noted, however, that before any test procedure is initiated, it is determined how many seconds should be taken for that test to be performed. Thus, if six seconds are chosen, the appropriate location in the CPU memory is loaded with a count of 6000 and is decremeted upon the receipt of every interrupt pulse. The "try again" sub-routine is entered every time the timer count reaches zero. In addition, the number of tries to be employed for a given step is stored and decremented after each try. The failure light is lit when the count of the number of tries reaches zero.

The telephone test unit described herein is a simple-to-operate test unit for substantially all commercially available telephones. It can be operated by untrained personnel who need have no more knowledge than how to plug in a telephone cord plug and operate a telephone.

Having described a specific embodiment of a new and improved telephone test set constructed in accordance with the present invention, it is believed that other modifications, variations and changes will be suggested to those skilled in the art in light of the above teachings. It is, therefore, to be understood that all such variations, modifications and changes are believed to come within the scope of the invention as defined by the appended claims.

APPENDIX I

Flow Chart

1. Operate Block #1 Light
2. Watch Start Switch For True
3. If Start Switch not True, Then To 2
4. Turn Off Block 1; Reset Start Switch; Enable Start Switch
5. Light Block 2; Set 6 Second Timer
6. Look For OC To Be True
7. True, Then To Fail
8. Check For NORM To Be True
9. If True, Then To 15
10. Check Start Switch For True
11. True, Then To 15
12. Check 6 Second Timer To Be 0
13. If True, Then Try Again
14. Go To 6
15. Reset Start Switch; Enable Start Switch
16. Turn Off Block 2
17. Turn On Block 3
18. Set 1633, 1209 on (OSC On)
19. Set #0 In 5×7 Matrix
20. Check For Number Dialed To Be Tone or DP
21. Check For Start Switch To Be True
21A. If True, Then To 23
22. If DP, Then To DP Test
22A. If Tone, Then Tone Test
23. Set 1209 Off and 941 On
24. Turn Off Block 3
25. Turn Off 5×7 Matrix
26. Turn On Block 4
27. Reset Start Switch
28. Enable Start Switch
29. Operate SND Relay
30. Set 6 second Timer
31. Check Start Switch To Be True
32. If True, Then To 37
33. Check MF Receiver For A Hex "D"
34. If True, Then To 37
35. Decrement 6 second timer; If 6 second timer=0, Then Try Again
36. Go To 31
37. Reset Start Switch
38. Enable Start Switch
39. Turn Off Block 4
40. Turn On Block 5
40A. Drop SND Relay; Operate TXRX Relay
41. Set 6 Second Timer And Number Of Tries To 4
42. Check For Start Switch To Be True
43. If True, Then To 49
44. Check MF Receiver For A Hex "D"
45. If True, Then To 49
46. Decrement 6 Second Counter
47. If 6 Second=0, Then Try Again
48. Go To 42
49. Reset Start Switch
50. Enable Start Switch
51. Turn Off Block 5
52. Turn On Block 6
53. Drop TXRX Relay
54. Set RXSTR=0
55. Set 1209, 1633 On=0, 941 Off=1
56. Load 6 Second Counter
57. Check Start Switch To Be True
58. If True, Then To 64
59. 1 Watch NORM For Absence
60. If True, Then To 64
61. Decrement 6 Second Counter
62. If 6 Second Counter=0, Then Try Again
63. Go To 57
64. Reset Start Switch
65. Enable Start Switch
66. Turn Off Block 6
67. Turn On Block 7
68. Set 60 Second Timer; Watch Start Switch
69. If True, Then Back To Start
70. Operate RNG Relay; Go Thru Ringing Codes

TRY AGAIN SUB-ROUTINE

1. Store Status Of Port $\overline{WR14}$ and $\overline{WR13}$; Store Status of Port $\overline{WR10}$
2. Check 4 Try Counter
3. If 4 Try=0, Then Fail
4. Light Try Again Light (Or In Try Again)
5. Drop TXRX Relay
6. Set Up Tone To Speaker (1633, 1204, 852)
7. Hold For 3 Seconds
8. Restore Status
9. Return

FAIL SUB-ROUTINE

1. Light Fail Light
2. Watch Start Switch
3. If Start Switch True, Then Back To Start
4. Hold For 10 Seconds
5. Back To Start

DTMF TEST SUB-ROUTINE (The following steps are repeated for each digit and the # and * keys):

Display Digit If correct key hit, exit.
If incorrect key, turn on try again lamp for ½ second.
If ten seconds elapsed, fail test.

DIAL PULSE TEST SUB-ROUTINE (The following steps are repeated for each digit):
Display Digit
If ten seconds elapsed, fail test.
Once the beginning of the dial pulses is seen, take up to 1200 samples at 1 millisecond intervals.
Quit sampling if interdigit time (200 milliseconds) is seen.
A Make State:
  Begins with three consecutive TRUE samples at 1 ms intervals.
  Ends with three consecutive FALSE samples at 1 ms intervals.
A Break State:
  Begins with three consecutive FALSE samples at 1 ms intervals.
  Ends with three consecutive TRUE samples at 1 ms intervals.
Beginning with the first break, the number of makes and breaks and the length of each is recorded.
If the number of breaks does not match the desired digit, fail the test.
The remaining steps are executed only for digit zero:
If the total time from the end of the first break to the end of the 10th break does not fall within the range of 796 to 1034 ms, fail the test.
Make sure that the first pulse conforms to the specifications for minimum and maximum make and break.
Make sure that the make/break ratio for the 1st, 5th, and 9th pulse falls within the range of 57% to 65% break.

APPENDIX II

LIST OF COMPONENTS

The following is a list of components employed in the embodiment disclosed herein. These components are listed by way of example only and can be replaced in groups or individually with components capable of performing the functions described herein.

| Component | Type |
| --- | --- |
| CPU10 | Z80 Microprocessor |
| EPROMs 27, 29, 30 | 2732 Erasable PROM |
| RAMs 72, 74 | 4802 Random Access Memory |
| Comparatos 77, 175 | 74LS85 4-Bit Magnitude Comparator |
| Decoders 70, 75, 99, 32 | 74LS138 8-Bit Decoder |
| Bus Driver 31 | 74LS374 8-Bit D Type Flip-Flop |
| Counter 45 | 74LS93 4-Bit Binary Counter |
| Counters 47, 49 | 4518 Dual Synchronous Counter |
| Counter 50 | 14160 Decode Counter |
| Flip-Flop 51 | 4015 "D" Type Flip-Flop |
| One-Shot 59 | 4047 |
| AVD Gates 34, 36, 38, 63 | LS08 |
| Inverters 55, 57, 119, 120, 25, 127 | 74C14 |
| Inverters 60, 61, 65 | 74LS04 |
| OR Gates 67, 69, 71, 73 | LS32 |
| EX-OR Gates 171, 172, 173 | LS266 |
| Drivers 79, 80, 81; 94–106 | 7407 |
| Drivers 83–92, 140 | ULN 2803 |
| DTMF Receiver 117 | M957 |
| Tone Generator 131 | 5089 |
| Latch 39, 141 | 74LS244 |
| Bit Rate Multipliers 150, 151 | 4089 |
| Counter 155 | 4024 |
| Counters 157, 159 | |
| D/A Converter 160 | MF10- National Semiconductor Corp. |
| 8-Bit Switch | 4051 |

-continued

| Component | Type |
| --- | --- |
| Op-Amps 130, 133, 135, 110, 111, 113, 163 | LM324 |
| Op-Amps 129, 165, 167 | LM380 |
| Switches 115, 137 | 4066 |
| Drivers 142–149, 153, 139 | 4504 |
| R1, R5, R7, R10, R19, R27 | 10K ohms |
| R2, R26 | 9.1K ohms |
| R3 | 4.2K ohms |
| R4, R18 | 100K ohms |
| R6, R9, R32 | 200K ohms |
| R8, R11, R25 | 10 M ohms |
| R14, R23 | 910 ohms |
| R15 | .9K ohms |
| R16, R28 | 1K ohms |
| R17 | 2K ohms |
| R20 | 2.7K ohms |
| R22 | 18K ohms |
| R24 | 1 M ohms |
| C5, C9 | 0.5 uf |
| C8 | .01 uf |
| 5 × 7 Matrix | DLS 735 (Siemans) |

APPENDIX III

OPTIONAL TEST FOR GROUNDED AND SUPERIMPOSED RINGING

The following described optional hardware can be attached to the subject invention for use in testing telephones in those geographical areas where ring voltage is connected from ground to either Tip or Ring in order to allow for multiple parties on the same line. In such situations, a third wire from the telephone is connected to earth ground. The ringer is connected from this third wire to either Tip or Ring (grounded ringing). Additionally, in some areas, a DC voltage is connected in series with the ringing supply in the central office such that a DC threshold device in the telephone can allow the ringer to operate only on one polarity or the other of such series DC voltage (superimposed Ringing).

When the Ringer Test Button is pressed on the subject invention, the CPU will cause optional relays to apply the ringing voltage, generated as previously described, to be applied between a third wire (ground) and first Tip and then Ring. If superimposed ringing is required, yet other optional relays will cause to be inserted, in series with the ringing supply, a DC voltage of first one polarity and then the other, executing this sequence while applying ringing voltage to first Tip then to Ring. Thus, four combinations of polarity and Tip or Ring connection will have been sequenced through as a result of one pressing of the ringing switch.

Note that in any application which requires sequentially testing various ringing polarities and/or ground connections and/or frequencies, it is desirable that the ringing switch be pressed only momentarily to signal the CPU to begin the test sequence. Thereafter the CPU should sequence through the ringing tests without requiring the user to hold the button down, since the user does not know when his particular ringing combination will be presented. This can be accomplished by connecting the ringing switch to an input port of the CPU so that during the step when ringing is normally tested, the CPU can read the status of the switch to determine if it is pressed.

We claim:
1. The method of testing a telephone test set comprising the steps of:

electrically generating a first humanly perceptable command instructing a user to plug the telephone set line cord into a test apparatus and to actuate a test procedure start switch;

terminating said first command and electrically generating a second humanly perceptable command instructing a user to lift the handset of the telephone set;

passing current through the line cord of the telephone line to determine if the handset has been lifted;

when the handset has been lifted, terminating said second command and electrically generating a third humanly perceptable command instructing the user to perform another step in the test procedure;

wherein said another step comprises dialing a predetermined character on the telephone dial, said method further comprising the steps of:

displaying the predetermined character to be dialed;

determining from the dialed character the nature of a signal code employed by the telephone set in transmitting dialed digits via the line cord; and testing the dialed character to determine its correctness and the operative status of the telephone set dial mechanism and circuitry.

2. The method according to claim 1 further comprising the steps of:

sequentially displaying different dial characters to be dialed;

sequentially testing each coded character dialed by the user to determine its correctness and the operability of the dial mechanism and circuitry of the telephone set.

3. The method according to claim 1 further comprising the steps of:

automatically providing a failure indication if the coded dialed character is determined to be incorrect, or if the operative status of the telephone set dial mechanism and circuitry does not meet predetermined specifications;

if the coded dialed character is determined to be correct and the dial mechanism and circuitry are operative according to the predetermined specifications, automatically electrically generating a fourth humanly perceptible command instructing the user to place the telephone set mouthpiece adjacent a transducer on the test apparatus while transmitting a predetermined acoustic signal from said transducer and sensing electrical audio signals transmitted back to the test apparatus via the line cord of the telephone set;

measuring the sensed electrical audio signals to determine if they meet prescribed specifications therefor;

automatically providing a failure indication if the sensed audio signals do not meet the prescribed specifications therefor; and if the sensed audio signals do meet the prescribed specifications therefor, automatically electrically generating a fifth humanly perceptible command.

4. The method according to claim 3, wherein said fifth humanly perceptible command instructs the user to place the earpiece of the telephone set adjacent said transducer, the method further comprising the steps of:

transmitting predetermined electrical audio signals from said test apparatus to said telephone set via said line cord while sensing corresponding acoustic signals received at said transducer from the telephone set earpiece; and measuring the sensed corresponding acoustic signals to determine if they meet prescribed specifications therefor.

5. The method according to claim 4 further comprising the steps of:

automatically providing a failure indication if the sensed corresponding acoustic signals do not meet the prescribed specifications therefor;

if the sensed corresponding acoustic signals do meet the prescribed specifications therefor, automatically electrically generating a further humanly preceptable command.

6. The method according to claim 5 wherein said first, second, third, fourth, fifth and further commands are visible displays which are selectively lighted at a control panel of the test apparatus.

7. Apparatus for testing telephone sets having a line cord, said test apparatus comprising:

connector means for selectively connecting the line cord of a telephone set under test to said apparatus;

means for automatically illuminating a first indicator instructing a user to connect the line cord of a telephone set under test to said connector means;

means for selectively applying a predetermined voltage to the telephone under test via said line cord;

means for sensing the current passing through said line cord in response to said predetermined voltage and for providing a first signal if the sensed current is below a first specified value and a second signal if the monitored current exceeds a second specified value;

actuable failure indicator means; and means responsive to said first and second signals, individually, for actuating said failure indicating means.

8. The apparatus according to claim 7 wherein said telephone set further includes a selectively actuable hook switch, said apparatus further comprising:

means for automatically illuminating a second indicator instructing a user of the apparatus to take action which actuates said hook switch;

means responsive at least in part to actuation of said hook switch for automatically illuminating a third indicator instructing the user to dial a specified number on said telephone set;

means for sensing signals on said line cord to determine if said dialed specified number is transmitted as a coded dial pulse train or a plurality of code tones;

means responsive to said means for sensing and to a determination that the dialed specified number was transmitted as a plurality of code tones for indicating whether or not the tones have frequencies which reside within respective specified frequency bands; and means responsive to said means for sensing and to a determination that the specified number was transmitted as a coded dial pulse train for indicating whether or not a plurality of parameters of the pulse train fall within respective perscribed parameter ranges.

9. The apparatus according to claim 8 wherein said telephone set includes a mouthpiece and an earpiece, said apparatus further comprising:

a panel having an opening defined therein;

transducer means disposed behind said panel proximate said panel opening and responsive to electrical audio signals applied thereto for providing corresponding acoustic signals through said opening, and responsive to acoustic signals received through said opening for providing corresponding electrical audio signals in said apparatus;

means for automatically illuminating a fourth indication instructing a user of the apparatus to place the mouthpiece of said telephone set at the panel opening;

means responsive to said last-mentioned perceptible command for applying predetermined electrical audio signals to said transducer means; and means responsive to reception at said mouthpiece and transmission on said line cord of acoustic signals corresponding to said predetermined electrical audio signals for indicating whether or not a plurality of parameters of the signal is received via said mouth piece fall within respective prescribed parameter ranges.

10. The apparatus according to claim 9 further comprising:

means for automatically illuminating a fifth indicator instructing a user of the apparatus to place the earpiece of the telephone set at said panel opening;

means responsive to said further command for applying said predetermined audio electric signals to said telephone set via said line cord to that corresponding acoustic signals may be transmitted from said earpiece; and means responive to reception of said corresponding acoustic signals at said transducer means for indicating whether or not said plurality of parameters of the signals received at said transducer means fall within respective prescribed parameter ranges.

11. The apparatus according to claim 7 wherein said telephone set includes a mouthpiece and an earpiece, said apparatus further comprising:

a panel having an opening defined therein;

transducer means disposed behind said panel proximate said panel opening and responsive to electrical audio signals applied thereto for providing corresponding acoustic signals through said opening, and responsive to acoustic signals received through said opening for providing corresponding electrical audio signals in said apparatus;

means for automatically illuminating a second indicator instructing a user of the apparatus to place the mouthpiece of said telephone set at the panel opening;

means responsive to illumination of said second indicator for applying predetermined electrical audio signals to said transducer means; and means responsive to reception at said mouthpiece and transmision on said line cord of acoustic signals corresponding to said predetermined electrical audio signals for indicating whether or not a plurality of parameters of the signal is received via said mouthpiece fall within respective prescribed parameter ranges.

12. The apparatus according to claim 11 further comprising:

means for automatically illuminating a third indicator instructing a user of the apparatus to place the earpiece of the telephone set at said panel opening;

means responsive to said further command for applying said predetermined audio electric signals to said telephone set via said line cord so that corresponding acoustic signals may be transmitted from said earpiece; and means responsive to reception of said corresponding acoustic signals at said transducer means for indicating whether or not said plurality of parameters of the signals received at said transducer means fall within respective prescribed parameter ranges.

13. The apparatus accoding to claim 7 wherein said telephone set includes a mouthpiece and an earpiece, said apparatus further comprising:

connector means for selectively connecting said line cord to said apparatus;

a panel having an opening defined therein;

transducer means disposed behind said panel proximate said panel opening and responsive to electrical audio signals applied thereto for providing corresponding acoustic signals through said opening, and responsive to acoustic signals received through said opening for providing corresponding electrical audio signals in said apparatus;

means for automatically illuminating a second indicator instructing a user of the apparatus to place the mouthpiece of the telephone set at the panel opening;

means responsive to illumination of said second indicator for applying predetermined electrical audio signals to said transducer means; and means responsive to reception at said mouthpiece and transmission on said line cord of acoustic signals corresponding to said predetermined electrical audio signals for indicating whether or not a plurality of parameters of the signals received via said mouthpiece fall within the respective prescribed parameter ranges.

14. The apparatus according to claim 7 wherein said means for illuminating said first indicator includes a panel having selectively actuable lighted sections, each section representing a different command indicator for said user.

15. Apparatus for testing a telephone set having a line cord and a selectively actuable hook switch, said apparatus comprising:

connector means for selectively connecting said line cord to said apparatus;

means for automatically illuminating a first indicator instructing a user of the apparatus to take action which actuates said hook switch;

means responsive at least in part to actuation of said hook switch for automatically illuminating a second indicator instructing said user to dial a specified number on said telephone set;

means for sensing signals on said line cord to determine if said dialed specified number is transmitted as a coded dial pulse train or a plurality of code tones;

means responsive to said means for sensing and to a predetermination that a dialed specified number was transmitted as a plurality of code tones for indicating whether or not the tones have frequencies which reside with respective specified frequency bands; and means responsive to said means for sensing and to a determination that the specified number was transmitted as a coded dial pulse train for indicating whether or not a plurality of parameters of the pulse train fall within respective prescribed parameter ranges.

16. The apparatus according to claim 15 wherein said plurality of parameters includes the number of pulses in said pulse train, the repetition rate of pulses in said pulse train, and the duty cycle of pulses in said pulse train.

17. The apparatus according to claim 15 further comprising:
means for illuminating said first and second indicators instructing the user of the apparatus to dial each of the numbers, respectively, on the dial face of the telephone; and
means for determining whether or not each number dialed by the user has been correctly transmitted in coded form via said code line.

18. The apparatus according to claim 15 wherein said means for generating a humanly perceptible command includes a panel having selectively actuable lighted sections, each section representing a different command to said user.

19. Apparatus for testing a telephone set having a line cord, a mouthpiece and an earpiece, said apparatus comprising:
connector means for selectively connecting said line cord to said apparatus;
a panel having an opening defined therein;
transducer means disposed behind said panel proximate said panel opening and responsive to electrical audio signals applied thereto for providing corresponding acoustic signals through said opening, and further responsive to acoustic signals received through said opening for providing corresponding electrical audio signals in said apparatus;
means for automatically illuminating a first indicator instructing a user of the apparatus to place the mouthpiece of said telephone set at the panel opening;
means responsive to illumination of said first indicator for applying predetermined electrical audio signals to said transducer means; and
means responsive to reception at said mouthpiece and transmission on said line cord of acoustic signals corresponding to said predetermined electrical audio signals for indicating whether or not a plurality of parameters of the signals received via said mouthpiece fall within respective prescribed parameter ranges.

20. The apparatus according to claim 19 wherein said plurality of parameters include frequency and amplitude.

21. The apparatus according to claim 19 wherein said panel opening is covered by an acoustically transmissive screen and wherein said transducer means is mounted within said apparatus in alignment with said panel opening at a location between approximately three to three and one-half inches behind the screen.

22. The apparatus according to claim 19 further comprising:
means for automatically illuminating a second indicator instructing a user of the apparatus to place the earpiece of the telephone set at said panel opening;
means responsive to illumination of said second indicator for applying said predetermined audio electric signals to said telephone set via said line cord so that corresponding acoustic signals may be transmitted from said earpiece; and
means responsive to reception of said corresponding acoustic signals at said transducer means for indicating whether or not said plurality of parameters of the signals received at said transducer means fall within respective prescribed parameter ranges.

23. The apparatus according to claim 22 wherein said panel opening is covered by an acoustically transmissive screen and wherein said transducer means is mounted within said apparatus in alignment with said panel opening at a location between approximately three to three and one-half inches behind the screen.

24. The apparatus according to claim 19 wherein said means for illumination of said first indicator includes a panel having selectively actuable lighted sections, each section representing a different command to said user.

25. Apparatus for testing a telephone set having a line cord, a mouthpiece and an earpiece, said apparatus comprising:
connector means for selectively connecting said line cord to said apparatus;
a panel having an opening defined therein;
transducer means disposed behind said panel proximate said panel opening and responsive to electrical audio signals applied thereto for providing corresponding acoustic signals through said opening, and further responsive to acoustic signals received through said opening for providing corresponding electrical audio signals in said apparatus;
means for automatically illuminating a first indicator instructing a user of the apparatus to place the earpiece of the telephone set at said panel opening;
means responsive to illumination of said first indicator for applying said predetermined audio electric signals to said telephone set via said line cord so that corresponding acoustic signals may be transmitted from said earpiece; and
means responsive to reception of said corresponding acoustic signals at said transducer means for indicating whether or not said plurality of parameters of the signals received at said transducer means fall within respective prescribed parameter ranges.

26. The apparatus according to claim 25 wherein said means for illuminating said first indicator includes a panel having selectively actuable lighted sections, each section representing a different command to said user.

27. A telephone test apparatus for use with a telephone set having a mouthpiece and an earpiece, said apparatus comprising:
a panel having an opening therein;
a sound transmitting cover disposed over said opening;
transducer means disposed in said apparatus to receive acoustic signals from said earpiece and to transmit acoustic signals to said mouthpiece;
means for mounting said transducer means in alignment with said panel opening and spaced approximately three to three and one-half inches behind said panel;
a test panel having a plurality of individually and selectively illuminatable sections, each section representing a respective command to a user of the apparatus for testing said telephone set;
means for sequentially and automatically illuminating said section; and
means for sequentially initiating tests on said telephone set between sequential illumination of said panel sections.

28. In a telephone test apparatus for testing a telephone set, the combination comprising:
a panel having a plurality of individually illuminatable sections, each section representing a respective command to a user of the apparatus in operating the apparatus to test said telephone set;
means for automatically and sequentially illuminating said panel sections; and
means for automatically initiating tests of different operating parameters of said telephone set after illumination of each panel section, respectively, in sequence.

* * * * *